US012626928B2

(12) United States Patent
Maruhashi

(10) Patent No.: US 12,626,928 B2
(45) Date of Patent: May 12, 2026

(54) BINDER STORAGE CONTAINER FOR SECONDARY BATTERY AND BINDER PRODUCT FOR SECONDARY BATTERY

(71) Applicant: ZEON CORPORATION, Tokyo (JP)

(72) Inventor: Yutaka Maruhashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 19/108,172

(22) PCT Filed: Sep. 1, 2023

(86) PCT No.: PCT/JP2023/032136
§ 371 (c)(1),
(2) Date: Mar. 3, 2025

(87) PCT Pub. No.: WO2024/070505
PCT Pub. Date: Apr. 4, 2024

(65) Prior Publication Data
US 2026/0094833 A1      Apr. 2, 2026

(30) Foreign Application Priority Data

Sep. 30, 2022    (JP) ................................. 2022-158908

(51) Int. Cl.
*H01M 4/13*        (2010.01)
*C08K 5/42*        (2006.01)
*H01M 4/62*        (2006.01)
(52) U.S. Cl.
CPC .............. *H01M 4/622* (2013.01); *C08K 5/42* (2013.01)
(58) Field of Classification Search
CPC .......... H01M 4/13; H01M 4/62; H01M 4/139; H01M 4/622; H01M 10/0525;
(Continued)

(56) References Cited

U.S. PATENT DOCUMENTS

2014/0212728 A1*  7/2014  Kaneda ................ H01M 50/42
                                                         429/246
2017/0069913 A1*  3/2017  Yano ................ H01M 10/0525
(Continued)

FOREIGN PATENT DOCUMENTS

EP        3223349 A1    9/2017
EP        3605676 A1    2/2020
(Continued)

OTHER PUBLICATIONS

Mar. 1, 2025, International Preliminary Report on Patentability issued in the International Patent Application No. PCT/JP2023/032136.

*Primary Examiner* — Luan K Bui
(74) *Attorney, Agent, or Firm* — KENJA IP LAW PC

(57)        ABSTRACT

Provided are a binder storage container for a secondary battery and a binder product for a secondary battery that enable long-term storage of even a binder composition that can inhibit aggregate formation while also improving adhesiveness of a functional layer. The binder storage container for a secondary battery includes an accommodating part where a binder composition for a secondary battery is to be accommodated. The accommodating part is obtained through shaping of a resin composition that contains a polyolefin resin having a weight-average molecular weight of 400,000 or more as a main component. The accommodating part has a wall thickness of 2.5 mm or more and has a durability of 72 hours or more in an environmental stress cracking test in accordance with JIS K-6761 using dialkyl sodium sulfosuccinate aqueous solution of 1.5 mass % in concentration.

8 Claims, 1 Drawing Sheet

(58) Field of Classification Search
       CPC ........ H01M 50/409; C08K 5/42; C08L 55/02;
                         C08L 2201/08; C08L 2207/32; Y02E
                                           60/10
       USPC ....................... 429/163, 176; 206/524.6, 703
       See application file for complete search history.

(56)                 References Cited

U.S. PATENT DOCUMENTS

| | | | |
|---|---|---|---|
| 2020/0028175 A1* | 1/2020 | Serizawa ............ | H01M 4/0404 |
| 2023/0331976 A1* | 10/2023 | Shintani .................. | C08L 55/02 |

FOREIGN PATENT DOCUMENTS

| | | |
|---|---|---|
| EP | 4224568 A1 | 8/2023 |
| JP | H083364 A | 1/1996 |
| WO | 2015029835 A1 | 3/2015 |
| WO | 2016079996 A1 | 5/2016 |
| WO | 2018173839 A1 | 9/2018 |
| WO | 2022071523 A1 | 4/2022 |

* cited by examiner

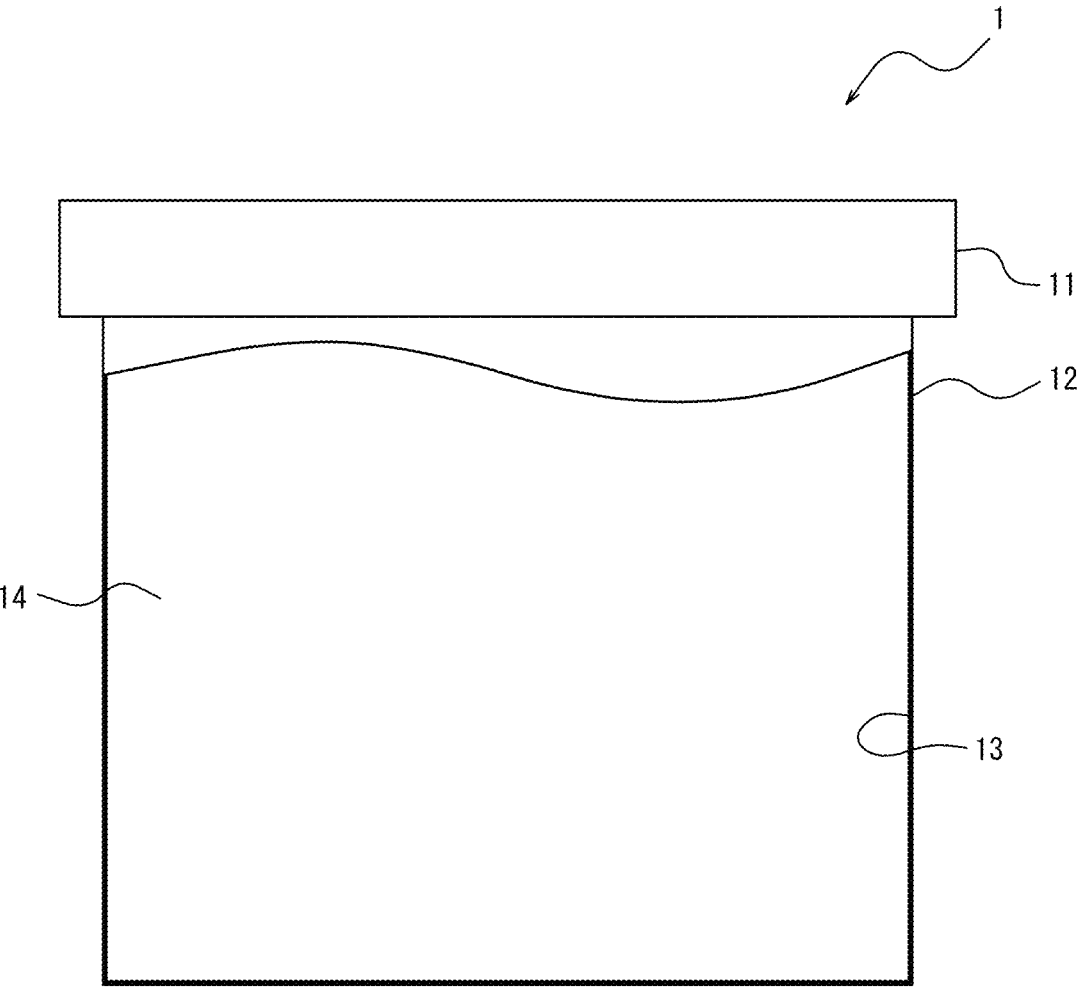

BINDER STORAGE CONTAINER FOR SECONDARY BATTERY AND BINDER PRODUCT FOR SECONDARY BATTERY

TECHNICAL FIELD

The present disclosure relates to a binder storage container for a secondary battery and a binder product for a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery generally includes battery members such as electrodes (positive electrode and negative electrode) and a separator that isolates the positive electrode and the negative electrode from each other.

A battery member of a secondary battery may be a member that includes a functional layer containing a binder (binding material) and optionally containing particles compounded so as to cause the battery member to display a desired function (hereinafter, referred to as "functional particles").

Specifically, a separator that includes an adhesive layer containing a binder or a heat-resistant layer containing a binder and non-conductive particles as functional particles on a separator substrate, for example, may be used as a separator of a secondary battery. Moreover, an electrode that includes an electrode mixed material layer containing a binder and electrode active material particles as functional particles on a current collector or an electrode that further includes an adhesive layer or heat-resistant layer such as described above on an electrode substrate including an electrode mixed material layer on a current collector may be used as an electrode of a secondary battery.

A binder used to form a battery member is conventionally stored in a container in the form of a binder composition having the binder dissolved or dispersed in a solvent such as water (for example, refer to Patent Literature (PTL) 1).

It is desirable for a functional layer to display excellent adhesiveness in order to provide good close adherence with a substrate that supports the functional layer. Accordingly, in recent years, the surface tension of a binder composition has been lowered so as to inhibit aggregate formation in the binder composition after long-term storage while also improving adhesiveness of a functional layer with the aim of causing good close adherence of the functional layer to a substrate. For example, PTL 2 discloses the reduction of surface tension of a binder composition such that the surface tension thereof is controlled to within a specific range and also discloses hydrophobization coating of the inside of a container.

CITATION LIST

Patent Literature

PTL 1: WO2015/029835A1
PTL 2: WO2022/071523A1

SUMMARY

Technical Problem

The inventor studied the use of various emulsifiers with the aim of achieving even better control of the surface tension of a binder composition.

However, the inventor's studies revealed that in a situation in which a binder composition that contains an emulsifier is loaded into a container made of a resin and is then stored for a long time (for example, 1.5 years to 2 years) as a binder product, the emulsifier in the binder product permeates the container and thereby causes degradation of the container (i.e., reduces environmental stress cracking resistance of the container), which can result in damage of the container and leakage of contents (i.e., the binder composition) from the container.

Accordingly, an object of the present disclosure is to provide a binder storage container for a secondary battery and a binder product for a secondary battery that enable long-term storage of even a binder composition that can inhibit aggregate formation while also improving adhesiveness of a functional layer.

Solution to Problem

The inventor conducted diligent investigation with the aim of solving the problem set forth above. The inventor discovered that by producing an accommodating part of a binder storage container for a secondary battery using a resin composition that contains a polyolefin resin having a weight-average molecular weight of not less than a specific value as a main component, and by setting the wall thickness of the accommodating part as not less than a specific value, the accommodating part can display a specific durability in a specific environmental stress cracking test, and environmental stress cracking properties of the container can be improved. In this manner, the inventor completed the present disclosure.

Specifically, with the aim of advantageously solving the problem set forth above, [1] a presently disclosed binder storage container for a secondary battery comprises an accommodating part where a binder composition for a secondary battery is to be accommodated, wherein the accommodating part is obtained through shaping of a resin composition that contains a polyolefin resin having a weight-average molecular weight of 400,000 or more as a main component, the accommodating part has a wall thickness of 2.5 mm or more, and the accommodating part has a durability of 72 hours or more in an environmental stress cracking test in accordance with JIS K-6761 using dialkyl sodium sulfosuccinate aqueous solution of 1.5 mass % in concentration. A binder storage container for a secondary battery such as set forth above is capable of long-term storage of even a binder composition that can inhibit aggregate formation while also improving adhesiveness of a functional layer.

The environmental stress cracking test in accordance with JIS K-6761 referred to in the present disclosure can be performed by a method described in the EXAMPLES section.

Moreover, the weight-average molecular weight of a polyolefin resin referred to in the present disclosure can be measured by a method described in the EXAMPLES section.

[2] In the binder storage container for a secondary battery according to the foregoing [1], the polyolefin resin contained in the resin composition preferably has a molecular weight distribution, expressed by weight-average molecular weight/number-average molecular weight, of not less than 9 and not more than 13. When the resin composition contains a polyolefin resin having a weight-average molecular weight of 400,000 or more and also having a molecular weight distribution within the specific range set forth above, formability of the container improves, thereby enabling even longer term storage of a binder composition that can inhibit aggregate formation while also improving adhesiveness of a functional layer.

The molecular weight distribution of a polyolefin resin referred to in the present disclosure can be determined by a method described in the EXAMPLES section.

[3] In the binder storage container for a secondary battery according to the foregoing [1] or [2], the weight-average molecular weight of the polyolefin resin is preferably less than 500,000. When the weight-average molecular weight of the polyolefin resin is less than the upper limit set forth above, formability of the container improves, thereby enabling even longer term storage of a binder composition that can inhibit aggregate formation while also improving adhesiveness of a functional layer.

[4] In the binder storage container for a secondary battery according to any one of the foregoing [1] to [3], the polyolefin resin is preferably high-density polyethylene. The use of high-density polyethylene enables even longer term storage of a binder composition that can inhibit aggregate formation while also improving adhesiveness of a functional layer.

[5] In the binder storage container for a secondary battery according to any one of the foregoing [1] to [3], the resin composition is preferably an additive-free polyolefin resin. When the resin composition is an additive-free polyolefin resin, bleeding of additives into a binder composition from the container can be inhibited, and even longer term storage of a binder composition that can inhibit aggregate formation while also improving adhesiveness of a functional layer is possible.

The term "additive-free polyolefin resin" as used in the present disclosure refers to a polyolefin resin in which, with the exception of unavoidable contamination, additives are not actively compounded.

[6] In the binder storage container for a secondary battery according to any one of the foregoing [1] to [5], an inner wall surface of the accommodating part has preferably undergone hydrophobization treatment. Hydrophobization treatment of the inner wall surface of the accommodating part enables even longer term storage of a binder composition that can inhibit aggregate formation while also improving adhesiveness of a functional layer.

Moreover, with the aim of advantageously solving the problem set forth above, [7] a presently disclosed binder product for a secondary battery comprises: the binder storage container for a secondary battery according to any one of the foregoing [1] to [6]; and a binder composition accommodated in the accommodating part of the binder storage container for a secondary battery, wherein the binder composition has a surface tension of not less than 20 mN/m and not more than 60 mN/m. The binder product for a secondary battery set forth above has a low tendency for aggregates to form in the binder composition even upon long-term storage, enables the formation of a functional layer having excellent adhesiveness using the binder composition, and is capable of long-term storage of the binder composition.

The surface tension of a binder composition referred to in the present disclosure can be measured by a method described in the EXAMPLES section.

[8] In the binder product for a secondary battery according to the foregoing [7], the binder composition preferably contains a dialkyl sulfosuccinic acid ester salt. When the binder composition contains a dialkyl sulfosuccinic acid ester salt, the surface tension of the binder composition can be controlled well to a suitable value, and, as a result, wettability onto an adherend such as a separator, an electrode, a current collector, or an active material can be improved, and aggregate formation in the binder composition after long-term storage can be inhibited well while also sufficiently improving adhesiveness of a functional layer. Moreover, the use of the presently disclosed binder storage container for a secondary battery enables long-term storage of the binder composition even when the binder composition contains a dialkyl sulfosuccinic acid ester salt.

Advantageous Effect

According to the present disclosure, it is possible to provide a binder storage container for a secondary battery and a binder product for a secondary battery that enable long-term storage of even a binder composition that can inhibit aggregate formation while also improving adhesiveness of a functional layer.

BRIEF DESCRIPTION OF THE DRAWINGS

In the accompanying drawings:

FIG. 1 schematically illustrates one example of structure of the presently disclosed binder storage container for a secondary battery.

DETAILED DESCRIPTION

The following provides a detailed description of embodiments of the present disclosure.

The presently disclosed binder storage container for a secondary battery (hereinafter, also referred to simply as a "container") is a container that is used for storage, transport, or the like of a binder composition for a secondary battery (hereinafter, also referred to simply as a "binder composition"). Moreover, the presently disclosed binder product is a product having a binder composition accommodated in the presently disclosed container and is for storage, transport, or the like of the binder composition. Furthermore, the presently disclosed binder product can be used in production of a slurry composition for a functional layer (for example, a slurry composition for an electrode, a slurry composition for an adhesive layer, or a slurry composition for a heat-resistant layer) by withdrawing the binder composition that is accommodated therein and adding functional particles or the like to the binder composition as necessary. Such a slurry composition for a functional layer can be used to form a functional layer (for example, an electrode mixed material layer, an adhesive layer, or a heat-resistant layer) of a secondary battery.

(Binder Storage Container for Secondary Battery)

The presently disclosed container includes at least an accommodating part that can accommodate a binder composition. The accommodating part is obtained through shaping of a resin composition that contains a polyolefin resin having a weight-average molecular weight of 400,000 or more as a main component. Moreover, the accommodating part has a wall thickness of 2.5 mm or more. Furthermore, the accommodating part has a durability of 72 hours or more in an environmental stress cracking test in accordance with JIS K-6761 using dialkyl sodium sulfosuccinate aqueous solution of 1.5 mass % in concentration. Consequently, the presently disclosed container is capable of long-term storage of even a binder composition that can inhibit aggregate formation while also improving adhesiveness of a functional layer (hereinafter, also referred to as "having excellent long-term binder composition storage capability"). It should be noted that the binder composition accommodated by the presently disclosed container is not limited to being a binder composition that can inhibit aggregate formation while also improving adhesiveness of a functional layer and that any binder composition can be accommodated in the presently disclosed container.

Although the container may be composed of just the accommodating part, the container may alternatively include the accommodating part and a cap that can seal an opening of the accommodating part so as to hermetically seal an internal space of the accommodating part from a viewpoint of facilitating loading and withdrawal of a binder composition.

The accommodating part of the container can have any shape such as a circular tube shape, a prismatic shape, or a bag shape without any specific limitations. Moreover, the cap of the container can have any shape without any specific limitations so long as it can seal an opening of the accommodating part.

One example of the shape of the container is described using FIG. 1. FIG. 1 schematically illustrates one example of structure of the presently disclosed binder storage container for a secondary battery. In FIG. 1, a container 1 includes a cap 11 and an accommodating part 12. An internal space 14 of the container 1 is defined by an inner wall surface 13 of the accommodating part 12 and the cap 11, and an opening of the accommodating part 12 is sealed by the cap 11.

<Material>

A requirement of the presently disclosed container is that the accommodating part is formed from a resin composition that contains a polyolefin resin having a weight-average molecular weight of 400,000 or more as a main component. The material of the optionally used cap may be glass, resin, or metal, for example, without any specific limitations. No specific limitations are placed on the resin, and it is possible to use the subsequently described resin composition that is used for the accommodating part, for example.

«Resin Composition»

The resin composition contains a polyolefin resin having a weight-average molecular weight of 400,000 or more as a main component and may optionally further contain additives.

The phrase "containing a polyolefin resin as a main component" as used in the present disclosure means that the polyolefin resin is contained in the resin composition in a proportion of 50 mass % or more.

The proportional content of the polyolefin resin in the resin composition is normally 50 mass % or more, preferably 80 mass % or more, more preferably 90 mass % or more, and even more preferably 95 mass % or more relative to 100 mass % of the total amount of the resin composition, and is normally 100 mass % or less relative to 100 mass % of the total amount of the resin composition.

[Polyolefin Resin]

The polyolefin resin may be a polyethylene resin such as polyethylene or an ethylene/α-olefin copolymer; a polypropylene resin such as polypropylene; or the like without any specific limitations. One of these resins may be used individually, or two or more of these resins may be used in combination.

Polyethylene resins such as polyethylene and ethylene/α-olefin copolymers are classified according to JIS K6760 as low-density polyethylene (LDPE) having a density of not less than 0.914 g/cm$^3$ and not more than 0.925 g/cm$^3$, medium-density polyethylene (MDPE) having a density of more than 0.925 g/cm$^3$ and not more than 0.94 g/cm$^3$, and high-density polyethylene (HDPE) having a density of more than 0.94 g/cm$^3$. Moreover, LDPE that is formed of an ethylene/α-olefin copolymer is also referred to as linear low-density polyethylene (LLDPE).

The density of the high-density polyethylene is preferably 0.945 g/cm$^3$ or more. When the density of the high-density polyethylene is not less than the lower limit set forth above, this results in even better long-term binder composition storage capability. Note that the density of polyethylene referred to in the present disclosure can be measured by a method described in the EXAMPLES section.

In the case of an ethylene/α-olefin copolymer, the α-olefin may be an α-olefin having a carbon number of 3 to 20, but is not specifically limited thereto. Specifically, the α-olefin may be 1-propylene, 1-butene, 1-pentene, 1-hexene, 1-heptene, 1-octene, 1-nonene, 1-decene, 1-dodecene, 4-methyl-1-pentene, 4-methyl-1-hexene, vinylcyclohexane, vinylcyclohexene, styrene, norbornene, butadiene, isoprene, or the like, for example. Of these α-olefins, 1-hexene is preferable. One of these α-olefins may be used individually, or two or more of these α-olefins may be used in combination.

The proportional content of α-olefin units in the ethylene/α-olefin copolymer is preferably 30 mol % or less.

From a viewpoint of even further improving long-term binder composition storage capability, the polyolefin resin is preferably a polyethylene resin, of which, polyethylene is preferable from viewpoints of workability, producibility, cost, and so forth, and high-density polyethylene (HDPE) is more preferable. Moreover, from a viewpoint of improving strength of the container, the polyolefin resin is preferably a mixture of high-density polyethylene and an ethylene/α-olefin copolymer, and more preferably a mixture of high-density polyethylene and an ethylene/1-hexene copolymer.

The proportion constituted by an ethylene/α-olefin copolymer in the polyolefin resin is preferably 5 mass % or more, and more preferably 10 mass % or more relative to 100 mass % of the polyolefin resin, and is preferably 40 mass % or less, and more preferably 30 mass % or less relative to 100 mass % of the polyolefin resin. When the proportion constituted by an ethylene/α-olefin copolymer is within any of the ranges set forth above, strength of the container can be even further increased.

As previously described, the polyolefin resin is required to have a weight-average molecular weight of 400,000 or more. When the weight-average molecular weight is less than 400,000, long-term binder composition storage capability cannot be ensured. From a viewpoint of even further increasing long-term binder composition storage capability, the weight-average molecular weight of the polyolefin resin is preferably 440,000 or more, and is preferably less than 500,000, and more preferably 480,000 or less.

Moreover, from a viewpoint of even further increasing long-term binder composition storage capability, it is preferable that the resin composition contains a polyolefin resin such as described above that has a molecular weight distribution (weight-average molecular weight/number-average molecular weight) of not less than 9 and not more than 13, and more preferable that all polyolefin resin contained in the resin composition has a molecular weight distribution of not less than 9 and not more than 13.

The molecular weight distribution of the polyolefin resin is preferably 10 or more.

[Additives]

Additives that can optionally be compounded in the resin composition are typically compounds having a molecular weight of 1,000 or less such as hydrotalcite, crystal nucleating agents, and so forth. Note that the resin composition is preferably an additive-free polyolefin resin. In other words, the resin composition is preferably the above-described polyolefin resin and preferably does not, with the exception of unavoidable contamination, have additives actively compounded therein. This is because bleeding of additives into a binder composition from the container can be inhibited, and, as a result, aggregate formation in the binder composition can be even further inhibited, adhesiveness of a functional layer can be even further improved, and long-term binder composition storage capability can be even further improved.

Hydrotalcite can be compounded in order to remove chloride ions or the like that remain after use in polymerization of the above-described resin. The amount of hydrotalcite that is compounded depends on the residual chlorine concentration, for example, but is preferably 10 ppm or more, and more preferably 100 ppm or more relative to the resin, and is preferably 1,000 ppm or less, and more preferably 500 ppm or less relative to the resin.

A crystal nucleating agent can be compounded in order to increase formability and strength of the container. The crystal nucleating agent may be a sorbitol crystal nucleating agent, a carboxylic acid metal salt crystal nucleating agent, an organic phosphoric acid metal salt crystal nucleating agent, or a rosin crystal nucleating agent. Of these crystal nucleating agents, an organic phosphoric acid metal salt crystal nucleating agent is preferable from a viewpoint of increasing formability and strength of the container.

The amount of the crystal nucleating agent that is compounded is preferably 10 ppm or more, and more preferably 100 ppm or more relative to the resin, and is preferably 5,000 ppm or less, and more preferably 1,000 ppm or less relative to the resin.

Examples of sorbitol crystal nucleating agents include dibenzylidene sorbitol derivatives described in JP-H8-3364A and 1.3,2.4-dibenzylidene sorbitol, 1.3-benzylidene-2.4-p-methylbenzylidene sorbitol, 1.3-benzylidene-2.4-p-ethylbenzylidene sorbitol, 1.3-p-methylbenzylidene-2.4-benzylidene sorbitol, 1.3-p-ethylbenzylidene-2.4-benzylidene sorbitol, 1.3-p-methylbenzylidene-2.4-p-ethylbenzylidene sorbitol, 1.3-p-ethylbenzylidene-2.4-p-methylbenzylidene sorbitol, 1.3,2.4-di(p-methylbenzylidene) sorbitol, 1.3,2.4-di(p-ethylbenzylidene) sorbitol, 1.3,2.4-di(p-n-propylbenzylidene) sorbitol, 1.3,2.4-di(p-1-propylbenzylidene) sorbitol, 1.3,2.4-di(p-n-butylbenzylidene) sorbitol, 1.3,2.4-di(p-s-butylbenzylidene) sorbitol, 1.3,2.4-di(p-t-butylbenzylidene) sorbitol, 1.3,2.4-di(2',4'-dimethylbenzylidene) sorbitol, 1.3,2.4-di(p-methoxybenzylidene)sorbitol, 1.3,2.4-di(p-ethoxybenzylidene) sorbitol, 1.3-benzylidene-2.4-p-chlorobenzylidene sorbitol, 1.3-p-chlorobenzylidene-2.4-benzylidene sorbitol, 1.3-p-chlorobenzylidene-2.4-p-methylbenzylidene sorbitol, 1.3-p-chlorobenzylidene-2.4-p-ethylbenzylidene sorbitol, 1.3-p-methylbenzylidene-2.4-p-chlorobenzylidene sorbitol, 1.3-p-ethylbenzylidene-2.4-p-chlorobenzylidene sorbitol, and 1.3, 2.4-di(p-chlorobenzylidene) sorbitol. Of these sorbitol crystal nucleating agents, bis(p-methylbenzylidene) sorbitol, 1,3,2,4-di(methylbenzylidene) sorbitol, 1,3,2,4-di(ethylbenzylidene) sorbitol, 1,3,2,4-di(methoxybenzylidene) sorbitol, and 1,3,2,4-di(ethoxybenzylidene) sorbitol are preferable.

Examples of carboxylic acid metal salt crystal nucleating agents include sodium adipate, potassium adipate, sodium sebacate, aluminum sebacate, potassium sebacate, sodium benzoate, and aluminum benzoate.

Examples of organic phosphoric acid metal salt crystal nucleating agents include aromatic organic phosphoric acid ester metal salts described in JP-H8-3364A, sodium 2,2'-methylenebis(4,6-di-t-butylphenyl)phosphate (for example, ADK STAB NA-11 produced by Adeka Corporation), and sodium bis(4-t-butylphenyl)phosphate (for example, ADK STAB NA-10 produced by Adeka Corporation). Of these organic phosphoric acid metal salt crystal nucleating agents, sodium 2,2'-methylenebis(4,6-di-t-butylphenyl)phosphate is preferable from a viewpoint of even further increasing formability and strength of the container.

Examples of rosin crystal nucleating agents include metal salts of rosin. For example, a commercially available product such as the crystal nucleating agent PINECRYSTAL KM-1500 produced by Arakawa Chemical Industries, Ltd. may be used.

[Production Method of Resin Composition]

No specific limitations are placed on the method by which the resin composition is produced. For example, the resin composition can be produced by adding the previously described additives, as necessary, to the previously described polyolefin resin, and then performing kneading thereof using any kneading device such as a kneading extruder or a Banbury mixer.

<Thickness>

A requirement of the presently disclosed container is that the accommodating part has a wall thickness of 2.5 mm or more. When the wall thickness of the accommodating part is less than 2.5 mm, long-term binder composition storage capability cannot be ensured. From a viewpoint of even further increasing long-term binder composition storage capability, the wall thickness of the accommodating part is preferably 2.6 mm or more, more preferably 2.9 mm or more, and even more preferably 3.1 mm or more. Moreover, from a viewpoint of inhibiting excessive weight increase of the container, the wall thickness of the accommodating part is preferably 4.5 mm or less, and more preferably 3.6 mm or less.

<Hydrophobization Treatment>

An inner wall surface of the accommodating part has preferably undergone hydrophobization treatment. This is because hydrophobization treatment of the inner wall surface of the accommodating part can inhibit permeation of an emulsifier into an inner wall of the accommodating part, and, as a result, can even further increase long-term storage capability with respect to a binder composition that contains an emulsifier. The hydrophobization treatment may be treatment through a silane coupling agent, treatment through a titanium coupling agent, treatment through an aluminum coupling agent, treatment through a fatty acid ester wax, treatment through a fatty acid ester wax, or treatment through a fluororesin. One of these treatments may be used individually, or two or more of these treatments may be used in combination. Of these treatments, treatment through a silane coupling agent and treatment through a fluororesin are preferable from a viewpoint of even further increasing long-term binder composition storage capability. In other words, the inner wall surface of the accommodating part is preferably coated by either or both of a layer (coating) formed of a silane coupling agent and a layer (coating) formed of a fluororesin.

«Treatment Through Silane Coupling Agent»

Examples of silane coupling agents include, but are not specifically limited to, sulfur-containing silane coupling agents such as γ-mercaptopropyltrimethoxysilane, γ-mercaptomethyltrimethoxysilane, γ-mercaptomethyltriethoxysilane, γ-mercaptohexamethyldisilazane, bis(3-triethoxysilylpropyl)tetrasulfane, and bis(3-triethoxysilylpropyl) disulfane; epoxy group-containing silane coupling agents such as γ-glycidoxypropyltrimethoxysilane, γ-glycidoxypropylmethyldimethoxysilane (3-glycidoxypropylmethyldimethoxysilane), β-(3,4-epoxycyclohexyl)ethyltrimethoxysilane, and γ-glycidoxypropylmethyldiethoxysilane (3-glycidoxypropylmethyldiethoxysilane); amino group-containing silane coupling agents such as N-(β-aminoethyl)-γ-aminopropyltrimethoxysilane, 3-aminopropyltrimethoxysilane (γ-aminopropyltrimethoxysilane), γ-aminopropyltriethoxysilane, N-(2-aminoethyl)-3-aminopropyltriethoxysilane, 3-triethoxysilyl-N-(1,3-dimethylbutylidene)propylamine, and N-phenyl-3-aminopropyltrimethoxysilane; (meth)acryloxy group-containing silane coupling agents such as γ-methacryloxypropyltrimethoxysilane, γ-methacryloxypropyltris(β-methoxyethoxy)silane, γ-methacryloxypropylmethyldimethoxysilane, γ-methacryloxypropylmethyl diethoxysilane, γ-methacryloxypropyltriethoxysilane, and γ-acryloxypropyltrimethoxysilane; vinyl group-containing silane coupling agents such as vinyltrimethoxysilane, vinyltriethoxysilane, vinyltris(β-methoxyethoxy)silane, vinyltrichlorosilane, and vinyltriacetoxysilane; chloropropyl group-containing silane coupling agents such as 3-chloropropyltrimethoxysilane; isocyanate group-containing silane coupling agents such as 3-isocyanatopropyltriethoxysilane; styryl group-containing silane coupling agents such as p-styryltrimethoxysilane; ureido group-containing silane coupling agents such as 3-ureidopropyltriethoxysilane; allyl group-containing silane coupling agents such as diallyldimethylsilane; alkoxy group-containing silane coupling agents such as tetraethoxysilane; phenyl group-containing silane coupling agents such as diphenyldimethoxysilane; fluoro group-containing silane coupling agents such as trifluoropropyltrimethoxysilane; and alkyl group-containing silane coupling agents such as isobutyltrimethoxysilane and cyclohexylmethyldimethoxysilane. One of these silane coupling agents may be used individually, or two or more of these silane coupling agents may be used in combination. Of these silane coupling agents, epoxy group-containing silane coupling agents are preferable from a viewpoint of even further increasing long-term binder composition storage capability, and 3-glycidoxypropylmethyldimethoxysilane is more preferable.

Note that the treatment through a silane coupling agent can be performed by a known method without any specific limitations so long as it is possible to form a layer formed of a silane coupling agent at the inner wall surface of the accommodating part. For example, a layer formed of a silane coupling agent can be formed at the inner wall surface of the accommodating part by dissolving a silane coupling agent in a solvent such as water or cyclohexane, applying the resultant solution onto the inner wall surface of the accommodating part, and subsequently performing drying to remove the solvent.

«Treatment Through Fluororesin»

Examples of fluororesins include, but are not specifically limited to, polytetrafluoroethylene, tetrafluoroethylene-perfluoroalkyl vinyl ether copolymer, tetrafluoroethylene-hexafluoropropylene copolymer, tetrafluoroethylene-ethylene copolymer, polyvinylidene fluoride, polychlorotrifluoroethylene, ethylene-chlorofluoroethylene copolymer, tetrafluoroethylene-perfluorodioxole copolymer, polyvinyl fluoride, tetrafluoroethylene-propylene copolymer, vinylidene fluoride-hexafluoropropylene copolymer, vinylidene fluoride-tetrafluoroethylene-hexafluoropropylene copolymer, acrylic-modified polytetrafluoroethylene, ester-modified polytetrafluoroethylene, epoxy-modified polytetrafluoroethylene, silane-modified polytetrafluoroethylene, and perfluoropolyether group-containing compounds. One of these fluororesins may be used individually, or two or more of these fluororesins may be used in combination. Of these fluororesins, perfluoropolyether group-containing compounds are preferable from a viewpoint of even further increasing long-term binder composition storage capability.

Note that the treatment through a fluororesin can be performed by a known method without any specific limitations so long as it is possible to form a layer formed of a fluororesin at the inner wall surface of the accommodating part. For example, a layer formed of a fluororesin can be formed at the inner wall surface of the accommodating part by dissolving a fluororesin in a solvent such as water or cyclohexane, applying the resultant solution onto the inner wall surface of the accommodating part, and subsequently performing drying to remove the solvent.

<Production Method of Container>

The presently disclosed container (accommodating part and optional cap) can be produced by shaping the above-described resin composition by a commonly known shaping method such as extrusion molding, injection molding, or blow molding, for example, without any specific limitations. In particular, it is preferable that the accommodating part is produced by blow molding from a viewpoint of production efficiency and cost. The wall thickness of the accommodating part of the container can be controlled by altering the shaping conditions.

No specific limitations are placed on the temperature during melting and kneading of the resin composition that is subjected to shaping (hereinafter, also referred to as the heating temperature). However, from a viewpoint of formability, the heating temperature is preferably 180° C. or higher, and is preferably 250° C. or lower.

Moreover, although no specific limitations are placed on the temperature of a mold used in shaping, the temperature is preferably 25° C. or higher, and is preferably 100° C. or lower. When the mold temperature is within any of the ranges set forth above, the occurrence of strain in the obtained container can be inhibited, and strength of the container can be increased.

Moreover, the container is preferably shaped in a clean environment in which the number of particles having a particle diameter of 0.5 μm is 100,000 or less per 1 ft³ (28.3 L). By producing the container in such an environment, it is possible to inhibit mixing of contaminants into a binder composition from the container, and, as a result, it is possible to even further inhibit aggregate formation due to contaminants in the binder composition. From a viewpoint of yet further inhibiting aggregate formation in a binder composition, the shaping is more preferably performed in a clean environment in which the number of particles having a particle diameter of 0.5 μm is 50,000 or less per 1 ft³ (28.3 L), and is even more preferably performed in a clean environment in which the number of particles having a particle diameter of 0.5 μm is 40,000 or less per 1 ft³ (28.3 L).

Note that the "number of particles having a particle diameter of 0.5 μm per 1 ft³ (28.3 L) of space" can be determined by a method described in WO2016/079996A1.

(Binder Product for Secondary Battery)

The presently disclosed binder product for a secondary battery (hereinafter, also referred to simply as a "binder product") includes a binder storage container for a secondary battery and a binder composition accommodated in an accommodating part of the container. The binder storage container for a secondary battery can be the presently disclosed container set forth above. In a case in which the container includes a cap, the binder composition can be withdrawn from an opening of the accommodating part by removing the cap from the accommodating part.

(Binder Composition)

The binder composition that is accommodated in the accommodating part of the container in the presently disclosed binder product for a secondary battery is required to have a surface tension of not less than 20 mN/m and not more than 60 mN/m. Moreover, the binder composition contains at least a binder and water and may optionally contain other components such as an emulsifier, a wetting agent, a defoamer, and a preservative. Note that it is preferable that the binder composition does not contain an organic solvent. Specifically, the ratio in which an organic solvent is contained in the binder composition (organic solvent content ratio) is preferably 1 mass % or less, more preferably 0.5 mass % or less, and particularly preferably 0.1 mass % or less.

<Surface Tension>

The surface tension of the binder composition is required to be not less than 20 mN/m and not more than 60 mN/m as previously described, is preferably 25 mN/m or more, and is preferably 50 mN/m or less, and more preferably 40 mN/m or less. When the surface tension of the binder composition is less than 20 mN/m, preservation stability decreases. Although the reason for this is not clear, it is presumed that when the surface tension of the binder composition is less than 20 mN/m, the binder becomes more easily attached to the inner wall surface of the container in a vacant part of the container (part remaining when the capacity occupied by the binder composition in the container is subtracted from the internal capacity of the container), a coating formed through drying of this attached binder falls into the binder composition, and this coating acts as a starting point for reduction of stability of a slurry composition. On the other hand, when the surface tension of the binder composition is more than 60 mN/m, adhesiveness of a functional layer decreases, presumably due to reduced affinity of the binder with functional particles or a substrate. Moreover, when the surface tension of the binder composition is more than 60 mN/m, reduction of affinity with functional particles causes loss of viscosity stability of a slurry composition that is produced using the binder composition.

Note that the surface tension of the binder composition can be controlled by altering the type and/or amount of the binder, emulsifier, and/or wetting agent, for example.

<Binder>

No specific limitations are placed on the binder so long as it has binding capacity. For example, a water-soluble polymer, a water-insoluble particulate polymer that can be dispersed in a dispersion medium such as water, or a combination thereof can be used as the binder. In particular, it is preferable to use a particulate polymer as the binder. Note that when a polymer is referred to as "water-insoluble" in the present disclosure, this means that when 0.5 g of the polymer is dissolved in 100 g of water at a temperature of 25° C., insoluble content is 90 mass % or more.

The water-soluble polymer may be a natural polymer, a semi-synthetic polymer, or a synthetic polymer, for example, without any specific limitations. More specifically, the water-soluble polymer may be a natural polymer such as a thickening polysaccharide, alginic acid or a salt thereof (for example, sodium alginate), or starch; a semi-synthetic polymer obtained through chemical treatment of a natural polymer serving as a raw material, such as carboxymethyl cellulose or a salt thereof; or a synthetic polymer such as polyvinylpyrrolidone or polyacrylic acid (cross-linked polyacrylic acid or non-cross-linked polyacrylic acid), for example.

The structure of the particulate polymer is not specifically limited, and the particulate polymer may have a core-shell structure that includes a core portion and a shell portion partially covering an outer surface of the core portion, or may not have such a core-shell structure.

The volume-average particle diameter of the particulate polymer is preferably not less than 100 nm and not more than 10 μm, but is not specifically limited thereto. Note that the volume-average particle diameter is the volume-average particle diameter D50 in a particle size distribution (by volume). The volume-average particle diameter D50 represents the diameter (median diameter) at which cumulative volume calculated from a small diameter end of the particle size distribution (by volume) reaches 50%. The particle size distribution can be measured using a commercially available particle size analyzer.

The degree of swelling in electrolyte solution of the particulate polymer is preferably not less than 110 mass % and not more than 1,300 mass %, but is not specifically limited thereto. The degree of swelling in electrolyte solution of the particulate polymer can be determined by a method described below. Note that the degree of swelling in electrolyte solution of the particulate polymer can be controlled through appropriate alteration of the chemical composition of the polymer.

«Measurement Method of Degree of Swelling in Electrolyte Solution»

A water dispersion containing the particulate polymer is loaded into a petri dish made of polytetrafluoroethylene. The water dispersion in the petri dish is dried at a temperature of 25° C. for 48 hours to obtain a dry film. The obtained film is cut to the required size as a test specimen, and then the weight thereof is measured and is taken to be W0.

Next, the obtained test specimen is immersed in electrolyte solution having a temperature of 60° C. for 72 hours. A solution containing $LiPF_6$ as a supporting electrolyte with a concentration of 1 M in a mixed solvent of ethylene carbonate (EC), diethyl carbonate (DEC), and vinylene carbonate (VC) (volume mixing ratio: EC/DEC/VC=68.5/30/1.5) is used as the electrolyte solution.

After this immersion, the test specimen is removed from the electrolyte solution, and electrolyte solution on the surface of the test specimen is wiped off. The weight of the test specimen after immersion is measured and is taken to be W1. The measured weights W0 and W1 are used to calculate the degree of swelling in electrolyte solution S (mass %) by S=(W1/W0)×100.

Examples of polymers that can be used as the particulate polymer include a conjugated diene polymer, an acrylic polymer, and so forth, but are not specifically limited thereto.

«Conjugated Diene Polymer»

The conjugated diene polymer is a polymer that includes a conjugated diene monomer unit. Specific examples of the conjugated diene polymer include, but are not specifically limited to, copolymers that include an aromatic vinyl monomer unit and an aliphatic conjugated diene monomer unit such as a styrene-butadiene copolymer (SBR); butadiene rubber (BR); copolymers that include a conjugated diene monomer unit and a nitrile group-containing monomer unit such as an acrylonitrile-butadiene copolymer (acrylic rubber, NBR); and hydrogenated polymers that are obtained through hydrogenation of a copolymer including a conjugated diene monomer unit and a nitrile group-containing monomer unit.

The following describes the chemical composition of a conjugated diene polymer that is suitable as the binder. This conjugated diene polymer includes an aliphatic conjugated diene monomer unit and can optionally include monomer units other than an aliphatic conjugated diene monomer unit (i.e., other monomer units).

[Aliphatic Conjugated Diene Monomer Unit]

Examples of aliphatic conjugated diene monomers that can form an aliphatic conjugated diene monomer unit include 1,3-butadiene, 2-methyl-1,3-butadiene (isoprene), and 2,3-dimethyl-1,3-butadiene. One of these aliphatic conjugated diene monomers may be used individually, or two or more of these aliphatic conjugated diene monomers may be used in combination. Of these aliphatic conjugated diene monomers, 1,3-butadiene is preferable.

The proportional content of aliphatic conjugated diene monomer units in the conjugated diene polymer when all repeating units in the conjugated diene polymer are taken to be 100 mass % is preferably 25 mass % or more, and more preferably 30 mass % or more, and is preferably 60 mass % or less, and more preferably 50 mass % or less.

[Other Monomer Units]

Examples of other monomer units include monomer units derived from known monomers that are copolymerizable with an aliphatic conjugated diene monomer such as described above. Examples of such monomers include aromatic vinyl monomers, nitrile group-containing monomers, (meth)acrylic acid alkyl ester monomers, carboxy group-containing monomers, and amide group-containing monomers. One of these monomers may be used individually, or two or more of these monomers may be used in combination. Of these monomers, aromatic vinyl monomers, (meth)acrylic acid alkyl ester monomers, and carboxy group-containing monomers are preferable, aromatic vinyl monomers and carboxy group-containing monomers are more preferable, and aromatic vinyl monomers are even more preferable. In other words, the conjugated diene polymer is particularly preferably an aliphatic conjugated diene-aromatic vinyl copolymer that includes an aliphatic conjugated diene monomer unit and an aromatic vinyl monomer unit.

—Aromatic Vinyl Monomer Unit—

Examples of aromatic vinyl monomers that can form an aromatic vinyl monomer unit include styrene, α-methylstyrene, vinyltoluene, and divinylbenzene. One of these aromatic vinyl monomers may be used individually, or two or more of these aromatic vinyl monomers may be used in combination. Of these aromatic vinyl monomers, styrene is preferable. The proportional content of aromatic vinyl monomer units in the conjugated diene polymer when all repeating units in the conjugated diene polymer are taken to be 100 mass % is preferably 5 mass % or more, and more preferably 10 mass % or more, and is preferably 80 mass % or less, and more preferably 70 mass % or less.

—Nitrile Group-Containing Monomer Unit—

Examples of nitrile-group containing monomers that can form a nitrile group-containing monomer unit include ethylenically unsaturated monomers having a nitrile group. Specifically, examples of nitrile group-containing monomers include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile is preferable as a nitrile group-containing monomer. Note that one nitrile group-containing monomer may be used individually, or two or more nitrile group-containing monomers may be used in combination in a freely selected ratio. The proportional content of aromatic vinyl monomer units in the conjugated diene polymer when all repeating units in the conjugated diene polymer are taken to be 100 mass % is preferably 40 mass % or less, and more preferably 30 mass % or less.

—(Meth)Acrylic Acid Alkyl Ester Monomer Unit—

Examples of (meth)acrylic acid alkyl ester monomers that can form a (meth)acrylic acid alkyl ester monomer unit include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate; methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate; and hydroxy group-containing (meth)acrylic acid alkyl esters such as 2-hydroxyethyl acrylate, 2-hydroxyethyl methacrylate, 2-hydroxypropyl acrylate, 2-hydroxypropyl methacrylate, hydroxybutyl acrylate, hydroxybutyl methacrylate, and 3-chloro-2-hydroxypropyl methacrylate. One of these (meth)acrylic acid alkyl ester monomers may be used individually, or two or more of these (meth)acrylic acid alkyl ester monomers may be used in combination. Of these (meth)acrylic acid alkyl ester monomers, hydroxy group-containing (meth)acrylic acid alkyl esters are preferable, and 2-hydroxyethyl acrylate is more preferable. The proportional content of (meth)acrylic acid alkyl ester monomer units in the conjugated diene polymer when all repeating units in the conjugated diene polymer are taken to be 100 mass % is preferably 0.3 mass % or more, more preferably 0.5 mass % or more, and even more preferably 0.6 mass % or more, and is preferably 20 mass % or less, and more preferably 15 mass % or less.

Note that in the present disclosure, "(meth)acryl" is used to indicate "acryl" and/or "methacryl".

—Carboxy Group-Containing Monomer Unit—

Examples of carboxy group-containing monomers that can form a carboxy group-containing monomer unit include monocarboxylic acids, derivatives of monocarboxylic acids, dicarboxylic acids, acid anhydrides of dicarboxylic acids, and derivatives of these dicarboxylic acids and acid anhydrides. Examples of monocarboxylic acids include acrylic acid, methacrylic acid, and crotonic acid. Examples of derivatives of monocarboxylic acids include 2-ethylacrylic acid, isocrotonic acid, α-acetoxyacrylic acid, 3-trans-aryloxyacrylic acid, α-chloro-3-E-methoxyacrylic acid, and 3-diaminoacrylic acid. Examples of dicarboxylic acids include maleic acid, fumaric acid, and itaconic acid. Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as butyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, dimethylmaleic anhydride, and citraconic anhydride. One of these carboxy group-containing monomers may be used individually, or two or more of these carboxy group-containing monomers may be used in combination. Of these carboxy group-containing monomers, dicarboxylic acids, derivatives of dicarboxylic acids, and acid anhydrides thereof are preferable, and itaconic acid is more preferable.

The proportional content of carboxy group-containing monomer units in the conjugated diene polymer when all repeating units in the conjugated diene polymer are taken to be 100 mass % is preferably 2 mass % or more, and more preferably 3 mass % or more, and is preferably 8 mass % or less, more preferably 6 mass % or less, and even more preferably 4 mass % or less.

—Amide Group-Containing Monomer Unit—

Examples of amide group-containing monomers that can form an amide group-containing monomer unit include methacrylamide, acrylamide, dimethylacrylamide, diethyl-acrylamide, diacetone acrylamide, hydroxyethyl acrylamide, hydroxymethyl acrylamide, hydroxypropyl acrylamide, and hydroxybutyl acrylamide. One of these amide group-containing monomers may be used individually, or two or more of these amide group-containing monomers may be used in combination in a freely selected ratio. Of these amide group-containing monomers, acrylamide is preferable.

The proportional content of amide group-containing monomer units in the conjugated diene polymer when all repeating units in the conjugated diene polymer are taken to be 100 mass % is particularly preferably 10 mass % or less.

«Acrylic Polymer»

The acrylic polymer is a polymer that includes a (meth)acrylic acid alkyl ester monomer unit. Examples of (meth)acrylic acid alkyl ester monomers that can form a (meth)acrylic acid alkyl ester monomer unit include methyl acrylate, ethyl acrylate, n-butyl acrylate, methyl methacrylate, ethyl methacrylate, and 2-ethylhexyl acrylate. Of these (meth)acrylic acid alkyl ester monomers, n-butyl acrylate and 2-ethylhexyl acrylate are preferable.

The acrylic polymer that can be used as the binder may be a polymer that includes a (meth)acrylic acid alkyl ester monomer unit such as described above and also includes an acid group-containing monomer unit, a nitrile group-containing monomer unit, and a cross-linkable monomer unit described below, for example, but is not specifically limited thereto.

[Acid Group-Containing Monomer Unit]

Examples of acid group-containing monomers that can form an acid group-containing monomer unit include carboxy group-containing monomers, sulfo group-containing monomers, phosphate group-containing monomers, and hydroxy group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid. Of these carboxy group-containing monomers, methacrylic acid is preferable.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

In the present specification, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present specification, "(meth)acryloyl" is used to indicate "acryloyl" and/or "methacryloyl".

Note that one of these acid group-containing monomers may be used individually, or two or more of these acid group-containing monomers may be used in combination in a freely selected ratio.

[Nitrile Group-Containing Monomer Unit]

Examples of nitrile group-containing monomers that can form a nitrile group-containing monomer unit include α,β-ethylenically unsaturated nitrile monomers. Specifically, any α,β-ethylenically unsaturated compound having a nitrile group can be used as an α,β-ethylenically unsaturated nitrile monomer without any specific limitations. Examples thereof include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile is preferable.

Note that one of these nitrile group-containing monomers may be used individually, or two or more of these nitrile group-containing monomers may be used in combination in a freely selected ratio.

[Cross-Linkable Monomer Unit]

A cross-linkable monomer unit is a monomer unit that can form a cross-linked structure during or after polymerization through heating or irradiation with energy rays.

Examples of monomers that can form a cross-linkable monomer unit include polyfunctional monomers having two or more groups displaying polymerization reactivity in the monomer. Examples of such polyfunctional monomers include divinyl compounds such as allyl methacrylate and divinylbenzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. Of these cross-linkable monomers, allyl methacrylate and allyl glycidyl ether are preferable.

Note that one of these cross-linkable monomers may be used individually, or two or more of these cross-likable monomers may be used in combination in a freely selected ratio.

[Proportional Contents of Monomer Units]

The proportional content of (meth)acrylic acid alkyl ester monomer units in the acrylic polymer when all repeating units in the acrylic polymer are taken to be 100 mass % is preferably 50 mass % or more, more preferably 55 mass % or more, and even more preferably 58 mass % or more, and is preferably 98 mass % or less, more preferably 97 mass % or less, and even more preferably 96 mass % or less. By setting the proportion constituted by (meth)acrylic acid alkyl ester monomer units as not less than the lower limit of any of the ranges set forth above, adhesiveness of a functional layer produced using the binder composition can be increased. Moreover, by setting this proportion as not more than any of the upper limits, electrochemical characteristics of an electrochemical device, such as a secondary battery, that includes a functional layer can be enhanced.

The proportional content of acid group-containing monomer units in the acrylic polymer when all repeating units in the acrylic polymer are taken to be 100 mass % is preferably 0.1 mass % or more, more preferably 0.3 mass % or more, and even more preferably 0.5 mass % or more, and is preferably 20 mass % or less, more preferably 10 mass % or less, and even more preferably 5 mass % or less. By setting the proportion constituted by acid group-containing monomer units as not less than any of the lower limits set forth above, dispersibility of a binding material in a functional layer can be increased, and electrochemical characteristics of a secondary battery that includes the functional layer can be sufficiently enhanced. Moreover, by setting the proportion constituted by acid group-containing monomer units as not more than any of the upper limits set forth above, the residual water content in a functional layer can be reduced, and electrochemical characteristics of a secondary battery can be sufficiently enhanced.

The proportional content of nitrile group-containing monomer units in the acrylic polymer when all repeating units in the acrylic polymer are taken to be 100 mass % is preferably 1 mass % or more, and more preferably 2 mass % or more, and is preferably 30 mass % or less, and more preferably 20 mass % or less. When the proportional content of nitrile group-containing monomer units is not less than any of the lower limits set forth above, binding strength of the acrylic polymer can be improved, and adhesiveness of a functional layer can be increased. On the other hand, when the proportional content of nitrile group-containing mono-mer units is not more than any of the upper limits set forth above, flexibility of the acrylic polymer can be increased.

The proportional content of cross-linkable monomer units in the acrylic polymer when the amount of all monomer units in the acrylic polymer is taken to be 100 mass % is preferably 0.1 mass % or more, and more preferably 1.0 mass % or more, and is preferably 3.0 mass % or less, and more preferably 2.5 mass % or less. By setting the propor-tion constituted by cross-linkable monomer units as not less than any of the lower limits set forth above, electrochemical characteristics of a secondary battery that includes a func-tional layer can be further enhanced. Moreover, by setting the proportion constituted by cross-linkable monomer units as not more than any of the upper limits set forth above, adhesiveness of a functional layer can be increased.

«Production Method of Binder»

The method by which the binder is produced is not specifically limited and may be a method in which a mono-mer composition containing the above-described monomers is polymerized by a known method.

The proportion constituted by each monomer in the monomer composition is normally the same as the propor-tion constituted by each monomer unit in the target binder. The polymerization method of the binder is not specifically limited, and any of solution polymerization, suspension polymerization, bulk polymerization, emulsion polymeriza-tion, and the like may be adopted, for example. Moreover, the polymerization reaction may be addition polymerization such as ionic polymerization, radical polymerization, or living radical polymerization. An emulsifier, dispersant, polymerization initiator, polymerization aid, or the like used in polymerization may be the same as typically used and the amount thereof may also be the same as typically used. Moreover, seed particles may be used to perform seeded polymerization in the polymerization. Note that a binder produced by suspension polymerization or emulsion polym-erization that is dispersed in an aqueous solvent is preferable in terms of having excellent handleability during transport and storage.

<Emulsifier>

The binder composition preferably contains an emulsifier. The inclusion of an emulsifier in the binder composition enables control of the surface tension of the binder compo-sition to an appropriate value, and, as a result, enables good inhibition of formation of aggregates in the binder compo-sition after long-term storage while also enabling sufficient improvement of adhesiveness of a functional layer.

The emulsifier may be a non-ionic emulsifier such as a polyoxyethylene alkyl ether, a polyoxyethylene alkyl phenol ether, a polyoxyethylene alkyl ester, or a polyoxyethylene sorbitan alkyl ester; an anionic emulsifier such as an alkyl-benzene sulfonic acid salt (for example, potassium dodecyl-benzenesulfonate or sodium dodecylbenzenesulfonate), a higher alcohol sulfuric acid ester salt, an alkyl sulfosuccinic acid salt (for example, a dialkyl sulfosuccinic acid ester salt such as dialkyl sodium sulfosuccinate), a β-naphthalene sulfonic acid formalin condensate sodium salt, a dodecyl diphenyl oxide disulfonic acid salt (for example, sodium dodecyl diphenyl oxide disulfonate), or a lauryl sulfuric acid salt (for example, sodium lauryl sulfate); a cationic emul-sifier such as an alkyl trimethyl ammonium chloride, a dialkyl ammonium chloride, or benzyl ammonium chloride; a copolymerizable emulsifier such as a sulfo ester of an α,β-unsaturated carboxylic acid, a sulfate ester of an α,β-unsaturated carboxylic acid, or a sulfoalkyl aryl ether; or the like.

One emulsifier may be used individually, or two or more emulsifiers may be used in combination. The emulsifier is preferably an anionic emulsifier from a viewpoint of improving wettability onto an adherend such as a separator, an electrode, a current collector, or an active material and also even further inhibiting formation of aggregates in the binder composition after long-term storage while also fur-ther improving adhesiveness of a functional layer, is pref-erably an alkylbenzene sulfonic acid salt, a β-naphthalene sulfonic acid formalin condensate sodium salt, a dodecyl diphenyl oxide disulfonic acid salt, a lauryl sulfuric acid salt, or an alkyl sulfosuccinic acid salt, is more preferably a dialkyl sulfosuccinic acid ester salt, and is even more preferably dialkyl sodium sulfosuccinate.

The amount of the emulsifier that is included in the binder composition is preferably 0.4 parts by mass or more per 100 parts by mass of the binder, and is preferably 5 parts by mass or less, and more preferably 2 parts by mass or less per 100 parts by mass of the binder. When the content of the emulsifier is 0.4 parts by mass or more per 100 parts by mass of the binder, adhesiveness of a functional layer can be further improved while also increasing viscosity stability of a slurry composition that is produced using the binder composition. In addition, viscosity stability of the binder composition can be improved. On the other hand, when the content of the emulsifier is 5 parts by mass or less per 100 parts by mass of the binder, adhesiveness of a functional layer can be sufficiently improved.

<Production Method of Binder Composition>

The binder composition can be obtained by mixing the components described above in the presence of water.

For example, the binder composition can be produced by adding and mixing other components such as an emulsifier, a wetting agent, a defoamer, and a preservative that are used as necessary with respect to an aqueous solution or water dispersion of the binder obtained after a polymerization reaction. Note that other components such as an emulsifier may alternatively be components that are contained in the aqueous solution or water dispersion of the binder.

From a viewpoint of even further inhibiting formation of aggregates, it is preferable that the binder composition is subjected to treatment for separating/removing contami-nants and the like before being used in "production of a binder product" described further below. It is preferable that microfiltration and/or filtration using a magnetic filter is adopted as the method of separating/removing contaminants from the binder composition, and even more preferable that a combination of microfiltration and filtration using a magnetic filter is adopted. This is because implementing microfiltration enables reliable removal of coarse contaminants. The mixing of a contaminant such as a metal into the binder composition may result in short-circuiting between electrodes due to the metal itself piercing through a separator in a secondary battery or due to the metal causing current concentration on a negative electrode and deposition of a conductive deposit on the negative electrode. However, by implementing filtration using a magnetic filter, it is possible to reliably remove magnetic contaminants such as magnetic metals (iron, nickel, chromium, etc.).

The microfiltration of the binder composition can be performed using a filter having an opening size of preferably not less than 5 μm and not more than 40 μm, more preferably not less than 5 μm and not more than 20 μm, and even more preferably not less than 5 μm and not more than 15 μm, for example. This is because effective removal of coarse contaminants may not be possible using a filter having an opening size of more than 40 μm. This is also because the rate of filtration decreases and binder composition productivity falls when using a filter having an opening size of less than 5 μm.

<Production Method of Binder Product>

The presently disclosed binder product is obtained by loading the above-described binder composition into the accommodating part of the container. The binder composition can be loaded into the accommodating part of the container by any known method without any specific limitations.

Loading of the binder composition is preferably performed in a clean environment in which the number of particles having a particle diameter of 0.5 μm is 100,000 or less per 1 ft³ (28.3 L). By performing loading under such conditions, mixing of contaminants into the binder composition from the surrounding environment during loading can be inhibited, and, as a result, aggregate formation due to contaminants in the binder composition can be even further inhibited. From a viewpoint of yet further inhibiting aggregate formation in the binder composition, loading of the binder composition is more preferably performed in a clean environment in which the number of particles having a particle diameter of 0.5 μm is 50,000 or less per 1 ft³ (28.3 L), and is even more preferably performed in a clean environment in which the number of particles having a particle diameter of 0.5 μm is 40,000 or less per 1 ft³ (28.3 L).

A vacant fraction in the binder product (capacity ratio of a vacant part, determined by subtracting capacity occupied by the binder composition in the container from the internal capacity of the container, relative to the internal capacity of the container) is preferably 10 volume % or less. When the vacant fraction is 10 volume % or less, aggregate formation in the binder composition after long-term storage can be even further inhibited while also further improving adhesiveness of a functional layer.

The binder product obtained as described above is preferably stored in an environment having a temperature of not lower than 5° C. and not higher than 40° C. By storing the binder product in a temperature range such as set forth above, aggregate formation in the binder composition can be sufficiently inhibited while also preventing degradation of the binder. As a result, adhesiveness of an obtained functional layer can be further improved.

(Application of Binder Product)

The binder composition that is loaded into the accommodating part of the container in the presently disclosed binder product can be used in production of a functional layer such as an electrode mixed material layer, an adhesive layer, or a heat-resistant layer, for example.

Although the following describes a case in which the binder composition contained in the presently disclosed binder product is used to produce a slurry composition for a heat-resistant layer and then to produce a separator that includes a heat-resistant layer on a separator substrate, the present disclosure is not limited to this case.

<Slurry Composition for Heat-Resistant Layer>

The slurry composition for a heat-resistant layer contains non-conductive particles, a binder composition, and other components that are used as necessary.

«Non-Conductive Particles»

The non-conductive particles are not specifically limited so long as they have heat resistance, and inorganic particles or organic particles described in WO2018/173839A1, for example, can be used.

«Binder Composition»

The binder composition described above can be used as the binder composition.

«Other Components»

Examples of other components that can be compounded in the slurry composition for a heat-resistant layer include commonly known components such as viscosity modifiers, dispersants, and surfactants without any specific limitations. Note that one of these other components may be used individually, or two or more of these other components may be used in combination.

«Production of Slurry Composition for Heat-Resistant Layer»

No specific limitations are placed on the method by which the slurry composition for a heat-resistant layer is produced. For example, the slurry composition for a heat-resistant layer can be produced by mixing the above-described binder composition, non-conductive particles, and other components that are used as necessary in the presence of a dispersion medium such as water. The method of mixing is not specifically limited, and the mixing can be performed using a typically used stirrer or disperser.

<Production of Separator>

A separator can be obtained by using the slurry composition for a heat-resistant layer to form a heat-resistant layer on a separator substrate. Specifically, a heat-resistant layer can be formed on a separator substrate using any of the following methods.

(1) A method in which the slurry composition for a heat-resistant layer is applied onto the surface of the separator substrate and is then dried (2) A method in which the separator substrate is immersed in the slurry composition for a heat-resistant layer and is then dried (3) A method in which the slurry composition for a heat-resistant layer is applied onto a releasable substrate and is dried to produce a heat-resistant layer that is then transferred onto the surface of the separator substrate Of these methods, method (1) is particularly preferable since it allows simple control of the thickness of the heat-resistant layer. In more detail, method (1) includes a step of applying the slurry composition for a heat-resistant layer onto the separator substrate (application step) and a step of drying the slurry composition for a heat-resistant layer that has been applied onto the separator substrate to form a heat-resistant layer on the separator substrate (drying step).

«Application Step»

The method by which the slurry composition for a heat-resistant layer is applied onto the separator substrate is not specifically limited and may be a commonly known method. Specific examples of application methods that can be used include doctor blading, dip coating, reverse roll coating, direct roll coating, gravure coating, extrusion coating, and brush coating. During application, the slurry composition may be applied onto just one side or both sides of the separator substrate. The thickness of the slurry coating on the separator substrate after application but before drying can be set as appropriate in accordance with the thickness of the heat-resistant layer that is to be obtained after drying.

The separator substrate onto which the slurry composition for a heat-resistant layer is applied may be a commonly known separator substrate such as a microporous membrane or non-woven fabric containing a polyolefin resin such as polyethylene or polypropylene, an aromatic polyamide resin, or cellulose fiber; or a porous resin coating containing an inorganic ceramic powder.

«Drying Step»

The method by which the slurry composition for a heat-resistant layer on the separator substrate is dried is not specifically limited and may be a commonly known method. Examples of drying methods that can be used include drying by warm, hot, or low-humidity air; drying in a vacuum; and drying by irradiation with infrared light, an electron beam, or the like. By drying the slurry composition on the separator substrate in this manner, it is possible to form a heat-resistant layer on the separator substrate, and thereby obtain a separator including the separator substrate and the heat-resistant layer.

The separator obtained as set forth above can suitably be used as a separator of a secondary battery such as a lithium ion secondary battery.

EXAMPLES

The following provides a more specific description of the present disclosure based on examples. However, the present disclosure is not limited to the following examples. In the following description, "%" and "parts" used in expressing quantities are by mass, unless otherwise specified. Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

Various measurements and evaluations in the examples and comparative examples were performed according to the following methods.

<Surface Tension>

The surface tension of a binder composition was measured by the platinum plate method in a 25° C. environment using an automatic surface tensiometer (Dy-300 produced by Kyowa Interface Science Co., Ltd.).

<Molecular Weight and Molecular Weight Distribution of Polyethylene Resin Composition>

After adding 100 mL of 1,2,4-trichlorobenzene to 0.1 g of a polyethylene resin composition, 1 hour of dissolution was performed under shaking at 140° C., and then heated filtration was performed using a 0.5 μm filter. This 0.1% (w/v) sample solution was subjected to measurement of molecular weight (weight-average molecular weight and number-average molecular weight) by gel permeation chromatography (GPC) under the following conditions. The obtained measurement values were used to calculate the molecular weight distribution (weight-average molecular weight/number-average molecular weight).

Measurement Conditions:

Eluent: 1,2,4-Trichlorobenzene (TCB) (+dibutylhydroxytoluene (BHT) 0.05%)

Standard substance: Polystyrene (PS)

Sample concentration: 0.1 w/v %

Injection volume: 300 μL

Flow rate: 1.0 mL/min

Column temperature: 140° C.

System temperature: 40° C.

Measurement apparatus: HLC-8321GPC/HT produced by Tosoh Corporation (RI detector used)

Column: TSKgel $GMH_{HR}$–H(20)HT×3 (produced by Tosoh Corporation; 7.8 mm I.D.×30 cm)

<Density of Polyethylene Resin Composition>

The density of a polyethylene resin composition was measured by Method A (underwater displacement method) in accordance with JIS K-7112.

<Inhibition of Aggregate Formation>

A binder composition loaded into a container produced in each example or comparative example (i.e., a binder product) was set in a constant temperature tank having an adjustable storage temperature and was stored at 25° C. for 90 days. The binder composition was subjected to an operation of shaking vertically and horizontally at points corresponding to 0 days, 30 days, and 60 days of storage. After 90 days of storage, aggregates in the binder composition were trapped using a 200-mesh stainless steel screen. The trapped aggregates were washed with water and were then dried at 100° C. under normal pressure for 1 hour using a dryer so as to cause evaporation of water. The amount (mass %) of aggregates after drying was calculated based on the amount (100 mass %) of solid content in the binder composition prior to storage and was then evaluated by the following standard. A smaller amount indicates that formation of aggregates is inhibited.

A: Amount of aggregates is less than 0.05 mass %

B: Amount of aggregates is not less than 0.05 mass % and less than 0.1 mass %

C: Amount of aggregates is 0.1 mass % or more

<Environmental Stress Cracking Test>

Ten test specimens of 38 mm×13 mm were cut out from a side surface of a container produced in each example or comparative example. An environmental stress cracking test was performed in accordance with JIS K-6761 Annex JC with the test solution changed to an aqueous solution of dialkyl sodium sulfosuccinate (product name: NEOCOL P; produced by DKS Co., Ltd.) of 1.5 mass % in concentration. The presence or absence of cracking of the test specimens was visually checked at 24 hour intervals, and the time taken until cracks had formed in at least 5 of the test specimens was evaluated by the following standard. A longer time indicates that the container has higher durability (environmental stress cracking resistance) and that long-term storage of a binder composition in the container is possible.

A: 168 hours or more

B: Not less than 120 hours and less than 168 hours

C: Not less than 72 hours and less than 120 hours

D: Less than 72 hours

<Peel Strength>

A separator produced in each example or comparative example was cut to 10 mm in width and 50 mm in length to obtain a test specimen. An SUS plate having double-sided tape (No. 5608 produced by Nitto Denko Corporation) affixed thereto was prepared, and the surface of a heat-resistant layer of the test specimen was affixed to this double-sided tape. The peel strength when one end of the separator substrate was pulled and peeled off at a speed of 50 mm/min with the peeling surface at 180° was measured and was evaluated by the following standard.

A: Peel strength of 20 N/m or more

B: Peel strength of not less than 15 N/m and less than 20 N/m

C: Peel strength of less than 15 N/m

<Production Example 1-1> (Production of Particulate Polymer 1)

A reactor equipped with a stirrer was supplied with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate. The gas phase was purged with nitrogen gas, and the temperature was raised to 60° C.

Meanwhile, a monomer composition was obtained in a separate vessel by mixing 50 parts of deionized water, 0.5 parts of sodium dodecylbenzenesulfonate as a dispersant, 94.2 parts of n-butyl acrylate (BA) as a (meth)acrylic acid alkyl ester monomer, 2 parts of methacrylic acid (MAA) as an acid group-containing monomer, 2 parts of acrylonitrile (AN) as a nitrile group-containing monomer, and 0.3 parts of allyl methacrylate (AMA) and 1.5 parts of allyl glycidyl ether (AGE) as cross-linkable monomers. The monomer composition was continuously added into the reactor over 4 hours to perform polymerization. The reaction was carried out at 60° C. during the addition. After completion of addition, a further 3 hours of stirring was performed at 70° C., and then the reaction was ended to produce a particulate polymer-containing water dispersion 1 (secondary battery binder 1).

<Production Example 1-2> (Production of Particulate Polymer 2)

A reactor equipped with a stirrer was supplied with 70 parts of deionized water, 0.15 parts of sodium lauryl sulfate (EMAL® 2F produced by Kao Corporation) as an emulsifier, and 0.5 parts of ammonium persulfate. The gas phase was purged with nitrogen gas, and the temperature was raised to 60° C.

Meanwhile, a monomer composition was obtained in a separate vessel by mixing 50 parts of deionized water, 0.2 parts of sodium dodecylbenzenesulfonate as a dispersant, 94.2 parts of n-butyl acrylate (BA) as a (meth)acrylic acid alkyl ester monomer, 2 parts of methacrylic acid (MAA) as an acid group-containing monomer, 2 parts of acrylonitrile (AN) as a nitrile group-containing monomer, and 0.3 parts of allyl methacrylate (AMA) and 1.5 parts of allyl glycidyl ether (AGE) as cross-linkable monomers. The monomer composition was continuously added into the reactor over 4 hours to perform polymerization. The reaction was carried out at 60° C. during the addition. After completion of addition, a further 3 hours of stirring was performed at 70° C., and then the reaction was ended to produce a particulate polymer-containing water dispersion 2 (secondary battery binder 2).

<Production Example 1-3> (Production of Particulate Polymer 3)

A 5 MPa pressure-resistant vessel equipped with a stirrer was charged with 3.8 parts of styrene as an aromatic vinyl monomer, 0.2 parts of methacrylic acid as a carboxy group-containing monomer, 100 parts of deionized water, 0.7 parts of dodecylbenzenesulfonic acid as an emulsifier, 0.1 parts of α-methylstyrene dimer as a chain transfer agent, and 0.3 parts of potassium persulfate as a polymerization initiator for core portion formation and was thoroughly stirred. Thereafter, the temperature was raised to 60° C. to initiate polymerization, which was then continued until the polymerization conversion rate reached 98% to yield seed particles. Next, the same pressure-resistant vessel was charged with 16 parts of acrylonitrile as a nitrile group-containing monomer, 30 parts of 1,3-butadiene as an aliphatic conjugated diene monomer, 0.3 parts of sodium dodecylbenzenesulfonate as an emulsifier, 50 parts of deionized water, and 0.4 parts of potassium persulfate as a polymerization initiator under stirring. The temperature was raised to 60° C., and polymerization was continued until the polymerization conversion rate reached 80% to yield a water dispersion containing a particulate polymer forming a core portion.

This water dispersion was heated to 70° C., and then polymerization was continued by continuously adding 6 parts of acrylonitrile as a nitrile group-containing monomer, 1 part of acrylamide as an amide group-containing monomer, 11 parts of 1,3-butadiene as an aliphatic conjugated diene monomer, 21 parts of styrene as an aromatic vinyl monomer, 8 parts of methyl methacrylate as a (meth)acrylic acid alkyl ester monomer, 1.5 parts of acrylic acid and 1.5 parts of itaconic acid as carboxy group-containing monomers, and 0.4 parts of t-dodecyl mercaptan as a chain transfer agent to the water dispersion for shell portion formation. At the point at which the polymerization conversion rate reached 96%, cooling was performed to quench the reaction to yield a water dispersion containing a particulate polymer that had a core-shell structure in which a shell portion completely covered the outer surface of a core portion. The obtained water dispersion containing the particulate polymer was adjusted to pH 8 through addition of 5% sodium hydroxide aqueous solution. In addition, 0.05 parts of a mineral oil defoamer (produced by Seiko PMC Corporation; product name: DF6351) was added as a defoamer per 100 parts of binder, and unreacted monomer was removed by thermal-vacuum distillation to produce a particulate polymer-containing water dispersion 3 (secondary battery binder 3).

<Production Example 2-1> (Production of Binder Composition 1)

A binder composition 1 was produced by adding and mixing 0.95 parts of dialkyl sodium sulfosuccinate (product name: NEOCOL P; produced by DKS Co., Ltd.), 0.04 parts of a mineral oil defoamer (produced by Seiko PMC Corporation; product name: DF6351), and 0.05 parts of an isothiazoline compound (2-methyl-4-isothiazolin-3-one) as a preservative with 100 parts (in terms of solid content of particulate polymer) of the particulate polymer-containing water dispersion 1 (secondary battery binder 1) produced in Production Example 1-1. The surface tension of this binder composition 1 was 26 mN/m.

<Production Example 2-2> (Production of Binder Composition 2)

A binder composition 2 was produced by adding and mixing 0.05 parts of dialkyl sodium sulfosuccinate (product name: NEOCOL P; produced by DKS Co., Ltd.), 0.04 parts of a mineral oil defoamer (produced by Seiko PMC Corporation; product name: DF6351), and 0.05 parts of an isothiazoline compound (2-methyl-4-isothiazolin-3-one) as a preservative with 100 parts (in terms of solid content of particulate polymer) of the particulate polymer-containing water dispersion 2 (secondary battery binder 2) produced in Production Example 1-2, and then diluting the resultant mixture through further addition of deionized water. The surface tension of this binder composition 2 was 55 mN/m.

<Production Example 2-3> (Production of Binder Composition 3)

A binder composition 3 was produced by adding and mixing 0.04 parts of a mineral oil defoamer (produced by Seiko PMC Corporation; product name: DF6351) and 0.05 parts of an isothiazoline compound (2-methyl-4-isothiazolin-3-one) as a preservative with 100 parts (in terms of solid content of particulate polymer) of the particulate polymer-containing water dispersion 1 (secondary battery binder 1) produced in Production Example 1-1. The surface tension of this binder composition 3 was 52 mN/m.

<Production Example 2-4> (Production of Binder Composition 4)

A binder composition 4 was produced by adding and mixing 0.1 parts of dialkyl sodium sulfosuccinate (product name: NEOCOL P; produced by DKS Co., Ltd.) and 0.1 parts of an isothiazoline compound (1,2-benzisothiazolin-3-one) as a preservative with 100 parts (in terms of solid content of particulate polymer) of the particulate polymer-containing water dispersion 3 (secondary battery binder 3) produced in Production Example 1-3, and then diluting the resultant mixture through further addition of deionized water. The surface tension of this binder composition 4 was 33 mN/m.

<Production Example 2-5> (Production of Binder Composition 5)

A binder composition 5 was produced by adding and mixing 0.1 parts of an isothiazoline compound (1,2-benzisothiazolin-3-one) as a preservative with 100 parts (in terms of solid content of particulate polymer) of the particulate polymer-containing water dispersion 3 (secondary battery binder 3) produced in Production Example 1-3, and then diluting the resultant mixture through further addition of deionized water. The surface tension of this binder composition 5 was 40 mN/m.

<Production Example 2-6> (Production of Binder Composition 6)

A binder composition 6 was produced by adding and mixing 2.5 parts of dialkyl sodium sulfosuccinate (product name: NEOCOL P; produced by DKS Co., Ltd.), 0.04 parts of a mineral oil defoamer (produced by Seiko PMC Corporation; product name: DF6351), and 0.05 parts of an isothiazoline compound (2-methyl-4-isothiazolin-3-one) as a preservative with 100 parts (in terms of solid content of particulate polymer) of the particulate polymer-containing water dispersion 1 (secondary battery binder 1) produced in Production Example 1-1. The surface tension of this binder composition 6 was 17 mN/m.

<Production Example 2-7> (Production of Binder Composition 7)

A binder composition 7 was produced by adding and mixing 0.01 parts of dialkyl sodium sulfosuccinate (product name: NEOCOL P; produced by DKS Co., Ltd.), 0.04 parts of a mineral oil defoamer (produced by Seiko PMC Corporation; product name: DF6351), and 0.05 parts of an isothiazoline compound (2-methyl-4-isothiazolin-3-one) as a preservative with 100 parts (in terms of solid content of particulate polymer) of the particulate polymer-containing water dispersion 2 (secondary battery binder 2) produced in Production Example 1-2, and then diluting the resultant mixture through further addition of deionized water. The surface tension of this binder composition 7 was 62 mN/m.

Example 1

<Production of Container 1>

A container 1 having a wall thickness of 3.1 mm and a capacity of 20 L was produced through blow molding of polyethylene having a weight-average molecular weight of 440,000, a density of 0.946 g/cm$^3$, and a molecular weight distribution of 9.6 under conditions of a heating temperature of 200° C. and a mold temperature of 70° C. The container 1 was subjected to an environmental stress cracking test. The result is shown in Table 1.

<Production of Binder Product 1>

A binder product 1 was obtained by performing microfiltration of 18 kg of the binder composition 1 produced in Production Example 2-1 using a 10 μm filter (product name: NXT10-10U; produced by Nihon Pall Ltd.) and then loading the binder composition 1 into the container 1 at a binder composition filling site where the number of particles having a particle diameter of 0.5 μm was 40,000/ft$^3$. The binder product 1 was used to evaluate inhibition of aggregate formation. The result is shown in Table 1.

<Production of Slurry Composition for Heat-Resistant Layer>

Alumina particles (product name: LS-256; produced by Nippon Light Metal Co., Ltd.; volume-average particle diameter D50: 0.5 μm) were prepared as non-conductive particles, sodium polyacrylate (product name: ARON T-50; produced by Toagosei Co., Ltd.) was prepared as a dispersant, and carboxymethyl cellulose having a degree of etherification of 0.8 to 1.0 (product name: 1220; produced by Daicel FineChem Ltd.) was prepared as a viscosity modifier.

After mixing 100 parts of the non-conductive particles and 0.5 parts of the dispersant with deionized water, 1 hour of treatment was performed by a bead mill (LMZ015 produced by Ashizawa Finetech Ltd.) to yield a dispersion liquid. In addition, 2 parts (in terms of solid content) of an aqueous solution of the viscosity modifier, 3 parts (solid content) of the binder composition 1 after 90 days of storage at 25° C. as the binder product 1, and 0.2 parts of a polyethylene glycol surfactant (product name: NOPTECHS E-D 052; produced by San Nopco Limited) were mixed with the dispersion liquid to produce a slurry composition for a heat-resistant layer.

<Production of Separator 1>

The slurry composition for a heat-resistant layer was applied onto one side of a separator substrate (porous substrate made of polyethylene; product name: Hipore ND412; produced by Asahi Kasei Corporation; thickness: 12 μm) using a table coater such as to have a thickness after drying of 2 μm and was dried at 50° C. for 3 minutes. In this manner, a separator 1 having a heat-resistant layer formed on the separator substrate was obtained. The peel strength of the separator 1 was evaluated. The result is shown in Table 1.

Example 2

<Production of Container 2>

A container 2 was produced in the same way as in Example 1 with the exception that the temperature of the mold used in blow molding was changed to 30° C. and the wall thickness of the container was changed to 2.9 mm in Example 1. The container 2 was subjected to an environmental stress cracking test. The result is shown in Table 1.

<Production of Binder Product 2>

A binder product 2 was produced and inhibition of aggregate formation was evaluated in the same way as in Example 1 with the exception that the container 2 was used instead of the container 1 in Example 1. The result is shown in Table 1.

<Production of Separator 2>

A separator 2 was produced and peel strength was evaluated in the same way as in Example 1 with the exception that a slurry composition for a heat-resistant layer was produced using the binder product 2 instead of the binder product 1 in Example 1. The result is shown in Table 1.

Example 3

<Production of Container 3>

A container 3 was produced in the same way as in Example 1 with the exception that polyethylene having a weight-average molecular weight of 500,000, a molecular weight distribution of 10.0, and a density of 0.943 g/cm³ was used instead of the polyethylene used in Example 1. The container 3 was subjected to an environmental stress cracking test. The result is shown in Table 1.

<Production of Binder Product 3>

A binder product 3 was produced and inhibition of aggregate formation was evaluated in the same way as in Example 1 with the exception that the container 3 was used instead of the container 1 in Example 1. The result is shown in Table 1.

<Production of Separator 3>

A separator 3 was produced and peel strength was evaluated in the same way as in Example 1 with the exception that a slurry composition for a heat-resistant layer was produced using the binder product 3 instead of the binder product 1 in Example 1. The result is shown in Table 1.

Example 4

<Production of Container 4>

A container 4 was produced in the same way as in Example 1 with the exception that polyethylene having a weight-average molecular weight of 480,000, a molecular weight distribution of 12.6, and a density of 0.951 g/cm³ was used instead of the polyethylene used in Example 1 and the wall thickness of the container was changed to 2.9 mm. The container 4 was subjected to an environmental stress cracking test. The result is shown in Table 1.

<Production of Binder Product 4>

A binder product 4 was produced and inhibition of aggregate formation was evaluated in the same way as in Example 1 with the exception that the container 4 was used instead of the container 1 in Example 1. The result is shown in Table 1.

<Production of Separator 4>

A separator 4 was produced and peel strength was evaluated in the same way as in Example 1 with the exception that a slurry composition for a heat-resistant layer was produced using the binder product 4 instead of the binder product 1 in Example 1. The result is shown in Table 1.

Example 5

<Production of Container 5>

A container 5 was produced in the same way as in Example 1 with the exception that polyethylene having a weight-average molecular weight of 400,000, a molecular weight distribution of 12.1, and a density of 0.953 g/cm³ was used instead of the polyethylene used in Example 1 and the wall thickness of the container was changed to 2.6 mm. The container 5 was subjected to an environmental stress cracking test. The result is shown in Table 1.

<Production of Binder Product 5>

A binder product 5 was produced and inhibition of aggregate formation was evaluated in the same way as in Example 1 with the exception that the container 5 was used instead of the container 1 in Example 1. The result is shown in Table 1.

<Production of Separator 5>

A separator 5 was produced and peel strength was evaluated in the same way as in Example 1 with the exception that a slurry composition for a heat-resistant layer was produced using the binder product 5 instead of the binder product 1 in Example 1. The result is shown in Table 1.

Example 6

<Production of Container 6>

A container 6 was produced in the same way as in Example 1 with the exception that low-density polyethylene having a weight-average molecular weight of 440,000, a molecular weight distribution of 13.2, and a density of 0.922 g/cm³ was used instead of the polyethylene used in Example 1 and the wall thickness of the container was changed to 3.4 mm. The container 6 was subjected to an environmental stress cracking test. The result is shown in Table 1.

<Production of Binder Product 6>

A binder product 6 was produced and inhibition of aggregate formation was evaluated in the same way as in Example 1 with the exception that the container 6 was used instead of the container 1 in Example 1. The result is shown in Table 1.

<Production of Separator 6>

A separator 6 was produced and peel strength was evaluated in the same way as in Example 1 with the exception that a slurry composition for a heat-resistant layer was produced using the binder product 6 instead of the binder product 1 in Example 1. The result is shown in Table 1.

Example 7

<Production of Container 7>

A container 7 was produced in the same way as in Example 5 with the exception that a polyethylene resin composition produced as described below was molded instead of the polyethylene used in Example 5. The container 7 was subjected to an environmental stress cracking test. The result is shown in Table 1.

«Production of Polyethylene Resin Composition»

The polyethylene resin composition was obtained by adding hydrotalcite (product name: DHT-4A; produced by Kyowa Chemical Corporation) as an additive to the polyethylene used in Example 5 in an amount of 200 ppm relative to the polyethylene and performing thorough kneading and homogenization thereof at a heating temperature of 200° C.

<Production of Binder Product 7>

A binder product 7 was produced and inhibition of aggregate formation was evaluated in the same way as in Example 1 with the exception that the container 7 was used instead of the container 1 in Example 1. The result is shown in Table 1.

<Production of Separator 7>

A separator 7 was produced and peel strength was evaluated in the same way as in Example 1 with the exception that a slurry composition for a heat-resistant layer was produced using the binder product 7 instead of the binder product 1 in Example 1. The result is shown in Table 1.

Example 8

<Production of Container 8>

A container 8 was produced in the same way as in Example 1 with the exception that a polyethylene resin composition produced as described below was used instead of the polyethylene used in Example 1, the mold temperature was changed to 30° C., and the wall thickness of the container was changed to 2.9 mm. The container 8 was subjected to an environmental stress cracking test. The result is shown in Table 1.

«Production of Polyethylene Resin Composition»

The polyethylene resin composition was obtained by adding an organic phosphoric acid crystal nucleating agent (product name: ADK STAB NA-11; produced by Adeka Corporation) as an additive to the polyethylene used in Example 1 in an amount of 500 ppm relative to the polyethylene and performing thorough kneading and homogenization thereof at a heating temperature of 200° C.

<Production of Binder Product 8>

A binder product 8 was produced and inhibition of aggregate formation was evaluated in the same way as in Example 1 with the exception that the container 8 was used instead of the container 1 in Example 1. The result is shown in Table 1.

<Production of Separator 8>

A separator 8 was produced and peel strength was evaluated in the same way as in Example 1 with the exception that a slurry composition for a heat-resistant layer was produced using the binder product 8 instead of the binder product 1 in Example 1. The result is shown in Table 1.

Example 9

<Production of Container 9>

A container 9 was produced in the same way as in Example 5 with the exception that a polyethylene resin composition produced as described below was molded instead of the polyethylene used in Example 5. The container 9 was subjected to an environmental stress cracking test. The result is shown in Table 1.

«Production of Polyethylene Resin Composition»

The polyethylene resin composition was obtained by adding 10 parts by mass of a polyethylene/1-hexene copolymer (ethylene/1-hexene=100/5 (mass ratio)) having a weight-average molecular weight of 420,000, a density of 0.933 g/cm³, and a molecular weight distribution of 12.4 to 90 parts by mass of the polyethylene used in Example 5 and performing thorough kneading and homogenization thereof at a heating temperature of 200° C.

<Production of Binder Product 9>

A binder product 9 was produced and inhibition of aggregate formation was evaluated in the same way as in Example 1 with the exception that the container 9 was used instead of the container 1 in Example 1. The result is shown in Table 1.

<Production of Separator 9>

A separator 9 was produced and peel strength was evaluated in the same way as in Example 1 with the exception that a slurry composition for a heat-resistant layer was produced using the binder product 9 instead of the binder product 1 in Example 1. The result is shown in Table 1.

Example 10

<Production of Binder Product 10>

A binder product 10 was produced and inhibition of aggregate formation was evaluated in the same way as in Example 1 with the exception that the binder composition 2 produced in Production Example 2-2 was loaded into the container 1 instead of the binder composition 1 in Example 1. The result is shown in Table 1.

<Production of Separator 10>

A separator 10 was produced and peel strength was evaluated in the same way as in Example 1 with the exception that a slurry composition for a heat-resistant layer was produced using the binder product 10 instead of the binder product 1 in Example 1. The result is shown in Table 1.

Example 11

<Production of Binder Product 11>

A binder product 11 was produced and inhibition of aggregate formation was evaluated in the same way as in Example 1 with the exception that the binder composition 3 produced in Production Example 2-3 was loaded into the container 1 instead of the binder composition 1 in Example 1. The result is shown in Table 1.

<Production of Separator 11>

A separator 11 was produced and peel strength was evaluated in the same way as in Example 1 with the exception that a slurry composition for a heat-resistant layer was produced using the binder product 11 instead of the binder product 1 in Example 1. The result is shown in Table 1.

Example 12

<Production of Binder Product 12>

A binder product 12 was produced and inhibition of aggregate formation was evaluated in the same way as in Example 1 with the exception that the binder composition 4 produced in Production Example 2-4 was loaded into the container 1 instead of the binder composition 1 in Example 1. The result is shown in Table 1.

<Production of Separator 12>

A separator 12 was produced and peel strength was evaluated in the same way as in Example 1 with the exception that a slurry composition for a heat-resistant layer was produced using the binder product 12 instead of the binder product 1 in Example 1. The result is shown in Table 1.

Example 13

<Production of Binder Product 13>

A binder product 13 was produced and inhibition of aggregate formation was evaluated in the same way as in Example 1 with the exception that the binder composition 5 produced in Production Example 2-5 was loaded into the container 1 instead of the binder composition 1 in Example 1. The result is shown in Table 1.

<Production of Separator 13>

A separator 13 was produced and peel strength was evaluated in the same way as in Example 1 with the exception that a slurry composition for a heat-resistant layer was produced using the binder product 13 instead of the binder product 1 in Example 1. The result is shown in Table 1.

Comparative Example 1

<Production of Container 10>

A container 10 was produced in the same way as in Example 1 with the exception that polyethylene having a weight-average molecular weight of 300,000, a molecular weight distribution of 13.5, and a density of 0.946 g/cm$^3$ was used instead of the polyethylene used in Example 1 and the wall thickness of the container was changed to 2.8 mm. The container 10 was subjected to an environmental stress cracking test. The result is shown in Table 1.

<Production of Binder Product 14>

A binder product 14 was produced and inhibition of aggregate formation was evaluated in the same way as in Example 1 with the exception that the container 10 was used instead of the container 1 in Example 1. The result is shown in Table 1.

<Production of Separator 14>

A separator 14 was produced and peel strength was evaluated in the same way as in Example 1 with the exception that a slurry composition for a heat-resistant layer was produced using the binder product 14 instead of the binder product 1 in Example 1. The result is shown in Table 1.

Comparative Example 2

<Production of Container 11>

A container 11 was produced in the same way as in Example 1 with the exception that the wall thickness of the container was changed to 1.4 mm in Example 1. The container 11 was subjected to an environmental stress cracking test. The result is shown in Table 1.

<Production of Binder Product 15>

A binder product 15 was produced and inhibition of aggregate formation was evaluated in the same way as in Example 1 with the exception that the container 11 was used instead of the container 1 in Example 1. The result is shown in Table 1.

<Production of Separator 15>

A separator 15 was produced and peel strength was evaluated in the same way as in Example 1 with the exception that a slurry composition for a heat-resistant layer was produced using the binder product 15 instead of the binder product 1 in Example 1. The result is shown in Table 1.

Comparative Example 3

<Production of Container 12>

A container 12 was produced in the same way as in Example 1 with the exception that polyethylene having a weight-average molecular weight of 360,000, a molecular weight distribution of 11.6, and a density of 0.960 g/cm$^3$ was used instead of the polyethylene used in Example 1 and the wall thickness of the container was changed to 2.3 mm. The container 12 was subjected to an environmental stress cracking test. The result is shown in Table 1.

<Production of Binder Product 16>

A binder product 16 was produced and inhibition of aggregate formation was evaluated in the same way as in Example 1 with the exception that the container 12 was used instead of the container 1 in Example 1. The result is shown in Table 1.

<Production of Separator 16>

A separator 16 was produced and peel strength was evaluated in the same way as in Example 1 with the exception that a slurry composition for a heat-resistant layer was produced using the binder product 16 instead of the binder product 1 in Example 1. The result is shown in Table 1.

Reference Example 1

<Production of Binder Product 17>

A binder product 17 was produced and inhibition of aggregate formation was evaluated in the same way as in Example 1 with the exception that the binder composition 6 produced in Production Example 2-6 was loaded into the container 1 instead of the binder composition 1 in Example 1. The result is shown in Table 1.

<Production of Separator 17>

A separator 17 was produced and peel strength was evaluated in the same way as in Example 1 with the exception that a slurry composition for a heat-resistant layer was produced using the binder product 17 instead of the binder product 1 in Example 1. The result is shown in Table 1.

Reference Example 2

<Production of Binder Product 18>

A binder product 18 was produced and inhibition of aggregate formation was evaluated in the same way as in Example 1 with the exception that the binder composition 7 produced in Production Example 2-7 was loaded into the container 1 instead of the binder composition 1 in Example 1. The result is shown in Table 1.

<Production of Separator 18>

A separator 18 was produced and peel strength was evaluated in the same way as in Example 1 with the exception that a slurry composition for a heat-resistant layer was produced using the binder product 18 instead of the binder product 1 in Example 1. The result is shown in Table 1.

TABLE 1

| | | | Example 1 | Example 2 | Example 3 | Example 4 | Example 5 | Example 6 |
|---|---|---|---|---|---|---|---|---|
| Container | | Type (No.) | 1 | 2 | 3 | 4 | 5 | 6 |
| | Resin composition | Polyethylene — Weight-average molecular weight | 440000 | 440000 | 500000 | 480000 | 400000 | 440000 |
| | | Molecular weight distribution | 9.6 | 9.6 | 10 | 12.6 | 12.1 | 13.2 |
| | | Density (g/cm³) | 0.946 | 0.946 | 0.943 | 0.951 | 0.953 | 0.922 |
| | | Ethylene/1-hexene copolymer (mass %) | — | — | — | — | — | — |
| | | Additives — Hydrotalcite (ppm) | — | — | — | — | — | — |
| | | Organic phosphoric acid crystal nucleating agent (ppm) | — | — | — | — | — | — |
| | Molding conditions | Heating temperature (°C) | 200 | 200 | 200 | 200 | 200 | 200 |
| | | Mold temperature (°C) | 70 | 30 | 70 | 70 | 70 | 70 |
| | | Wall thickness (mm) | 3.1 | 2.9 | 3.1 | 2.9 | 2.6 | 3.4 |
| | Binder composition | Type (No.) | 1 | 1 | 1 | 1 | 1 | 1 |
| | | Surface tension (mN/m) | 26 | 26 | 26 | 26 | 26 | 26 |
| | | Inclusion of emulsifier | Yes | Yes | Yes | Yes | Yes | Yes |
| | Type (No.) of binder product | | 1 | 2 | 3 | 4 | 5 | 6 |
| | Type (No.) of separator | | 1 | 2 | 3 | 4 | 5 | 6 |
| | Evaluation | Environmental stress cracking test | A | B | B | B | C | C |
| | | Inhibition of aggregate formation | A | A | A | A | A | A |
| | | Peel strength | A | A | A | A | A | A |

| | | | Example 7 | Example 8 | Example 9 | Example 10 | Example 11 | Example 12 |
|---|---|---|---|---|---|---|---|---|
| Container | | Type (No.) | 7 | 8 | 9 | 1 | 1 | 1 |
| | Resin composition | Polyethylene — Weight-average molecular weight | 400000 | 440000 | 400000 | 440000 | 440000 | 440000 |
| | | Molecular weight distribution | 12.1 | 9.6 | 12.1 | 9.6 | 9.6 | 9.6 |
| | | Density (g/cm³) | 0.953 | 0.946 | 0.953 | 0.946 | 0.946 | 0.946 |
| | | Ethylene/1-hexene copolymer (mass %) | — | — | 10 | — | — | — |
| | | Additives — Hydrotalcite (ppm) | 200 | — | — | — | — | — |
| | | Organic phosphoric acid crystal nucleating agent (ppm) | — | 500 | — | — | — | — |

TABLE 1-continued

| Molding conditions | Heating temperature (° C.) | 200 | 200 | 200 | 200 | 200 | 200 |
|---|---|---|---|---|---|---|---|
| | Mold temperature (° C.) | 70 | 30 | 70 | 70 | 70 | 70 |
| Wall thickness (mm) | | 2.6 | 2.9 | 2.6 | 3.1 | 3.1 | 3.1 |
| Binder composition | Type (No.) | 1 | 1 | 1 | 2 | 3 | 4 |
| | Surface tension (mN/m) | 26 | 26 | 26 | 55 | 52 | 33 |
| | Inclusion of emulsifier | Yes | Yes | Yes | Yes | No | Yes |
| Type (No.) of binder product | | 7 | 8 | 9 | 10 | 11 | 12 |
| Type (No.) of separator | | 7 | 8 | 9 | 10 | 11 | 12 |
| Evaluation | Environmental stress cracking test | B | A | B | A | A | A |
| | Inhibition of aggregate formation | B | B | A | B | B | A |
| | Peel strength | B | B | A | A | B | A |

| | | | Example 13 | Comparative Example 1 | Comparative Example 2 | Comparative Example 3 | Reference Example 1 | Reference Example 2 |
|---|---|---|---|---|---|---|---|---|
| Container | Type (No.) | | 1 | 10 | 11 | 12 | 1 | 1 |
| Resin composition | Polyethylene | Weight-average molecular weight | 440000 | 300000 | 440000 | 360000 | 440000 | 440000 |
| | | Molecular weight distribution | 9.6 | 13.5 | 9.6 | 11.6 | 9.6 | 9.6 |
| | | Density (g/cm$^3$) | 0.946 | 0.946 | 0.946 | 0.96 | 0.946 | 0.946 |
| | Ethylene/1-hexene copolymer (mass %) | | — | — | — | — | — | — |
| | Additives | Hydrotalcite (ppm) | — | — | — | — | — | — |
| | | Organic phosphoric acid crystal nucleating agent (ppm) | — | — | — | — | — | — |
| Molding conditions | Heating temperature (° C.) | | 200 | 200 | 200 | 200 | 200 | 200 |
| | Mold temperature (° C.) | | 70 | 70 | 70 | 70 | 70 | 70 |
| Wall thickness (mm) | | | 3.1 | 2.8 | 1.4 | 2.3 | 3.1 | 3.1 |
| Binder composition | Type (No.) | | 5 | 1 | 1 | 1 | 6 | 7 |
| | Surface tension (mN/m) | | 40 | 26 | 26 | 26 | 17 | 62 |
| | Inclusion of emulsifier | | No | Yes | Yes | Yes | Yes | Yes |
| Type (No.) of binder product | | | 13 | 14 | 15 | 16 | 17 | 18 |
| Type (No.) of separator | | | 13 | 14 | 15 | 16 | 17 | 18 |
| Evaluation | Environmental stress cracking test | | A | D | D | D | A | A |
| | Inhibition of aggregate formation | | A | A | A | A | C | C |
| | Peel strength | | B | A | A | A | C | C |

It can be seen from the examples, comparative examples, and reference examples that a binder composition having a surface tension of not less than 20 mN/m and not more than 60 mN/m can inhibit aggregate formation and improve adhesiveness of a functional layer. It can also be seen from the examples and comparative examples that the use of a container that is shaped using a resin composition containing a polyolefin resin having a weight-average molecular weight of 400,000 or more as a main component and that has a wall thickness of 2.5 mm or more enables long-term storage of even a binder composition that can inhibit aggregate formation and improve adhesiveness of a functional layer.

INDUSTRIAL APPLICABILITY

According to the present disclosure, it is possible to provide a binder storage container for a secondary battery and a binder product for a secondary battery that enable long-term storage of even a binder composition that can inhibit aggregate formation while also improving adhesiveness of a functional layer.

REFERENCE SIGNS LIST 1 container
11 cap
12 accommodating part
13 inner wall surface
14 internal space

The invention claimed is:

1. A binder storage container for a secondary battery comprising an accommodating part where a binder composition for a secondary battery is to be accommodated, wherein the accommodating part is obtained through shaping of a resin composition that contains a polyolefin resin having a weight-average molecular weight of 400,000 or more as a main component, the accommodating part has a wall thickness of 2.5 mm or more, and the accommodating part has a durability of 72 hours or more in an environmental stress cracking test in accordance with JIS K-6761 using dialkyl sodium sulfosuccinate aqueous solution of 1.5 mass % in concentration.

2. The binder storage container for a secondary battery according to claim 1, wherein the polyolefin resin contained in the resin composition has a molecular weight distribution, expressed by weight-average molecular weight/number-average molecular weight, of not less than 9 and not more than 13.

3. The binder storage container for a secondary battery according to claim 1, wherein the weight-average molecular weight of the polyolefin resin is less than 500,000.

4. The binder storage container for a secondary battery according to claim 1, wherein the polyolefin resin is high-density polyethylene.

5. The binder storage container for a secondary battery according to claim 1, wherein the resin composition is an additive-free polyolefin resin.

6. The binder storage container for a secondary battery according to claim 1, wherein an inner wall surface of the accommodating part has undergone hydrophobization treatment.

7. A binder product for a secondary battery comprising:

the binder storage container for a secondary battery according to claim 1; and a binder composition accommodated in the accommodating part of the binder storage container for a secondary battery, wherein the binder composition has a surface tension of not less than 20 mN/m and not more than 60 mN/m.

8. The binder product for a secondary battery according to claim 7, wherein the binder composition contains a dialkyl sulfosuccinic acid ester salt.

* * * * *